United States Patent
Boberg et al.

(10) Patent No.: US 7,334,673 B2
(45) Date of Patent: Feb. 26, 2008

(54) SYSTEM AND METHOD FOR MACHINING ELONGATE MEMBERS

(75) Inventors: Mark C. Boberg, Bellevue, WA (US); Mark P. Proulx, Des Moines, WA (US); Hugh R. Schlosstein, Renton, WA (US); C. Warren Turner, deceased, late of Renton, WA (US); by Gayle L. Turner, legal representative, Renton, WA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 10/869,688

(22) Filed: Jun. 16, 2004

(65) Prior Publication Data

US 2005/0279612 A1    Dec. 22, 2005

(51) Int. Cl.
*B65G 47/00* (2006.01)

(52) U.S. Cl. .................. 198/341.08; 198/339.1; 198/470.1; 198/474.1

(58) Field of Classification Search ........... 198/341.08, 198/339.1, 470.1, 474.1
See application file for complete search history.

(56) References Cited

U.S. PATENT DOCUMENTS

| | | | |
|---|---|---|---|
| 3,918,145 A | 11/1975 | Oglivie et al. | |
| 3,987,536 A | 10/1976 | Figueres et al. | |
| 4,218,815 A | 8/1980 | Cumming | |
| 4,621,410 A | 11/1986 | Williamson | |
| 4,679,295 A | 7/1987 | Lopez | |
| 5,368,539 A | 11/1994 | Mills et al. | |
| 5,657,529 A | 8/1997 | Bohn et al. | |
| 5,735,513 A * | 4/1998 | Toffolon | 269/43 |
| 5,940,302 A | 8/1999 | Pryor | |
| 5,943,750 A | 8/1999 | Koren et al. | |

* cited by examiner

*Primary Examiner*—Khoi H. Tran
(74) *Attorney, Agent, or Firm*—Alston & Bird LLP

(57) ABSTRACT

A system and method for machining an elongate workpiece in a plurality of work cells are provided. The work cells are positioned along a substantially linear process flow path so that the work operations can be performed on different lengthwise portions of the workpiece simultaneously. A transport system advances the workpiece from an infeed system along the process flow path, thereby moving the lengthwise portions of the workpiece successively through the work cells. The transport system includes a plurality of pallets that can be engaged to the workpiece so that the workpiece is supported by the pallets throughout at least part of the machining system.

36 Claims, 9 Drawing Sheets

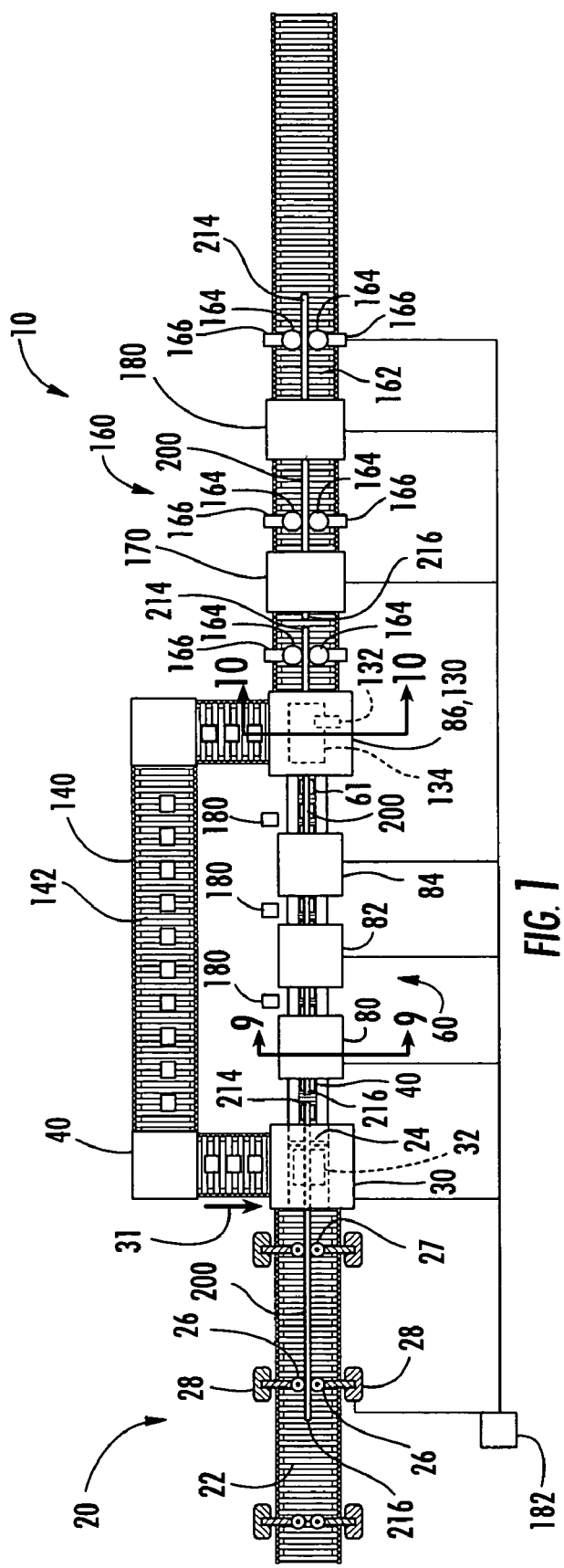

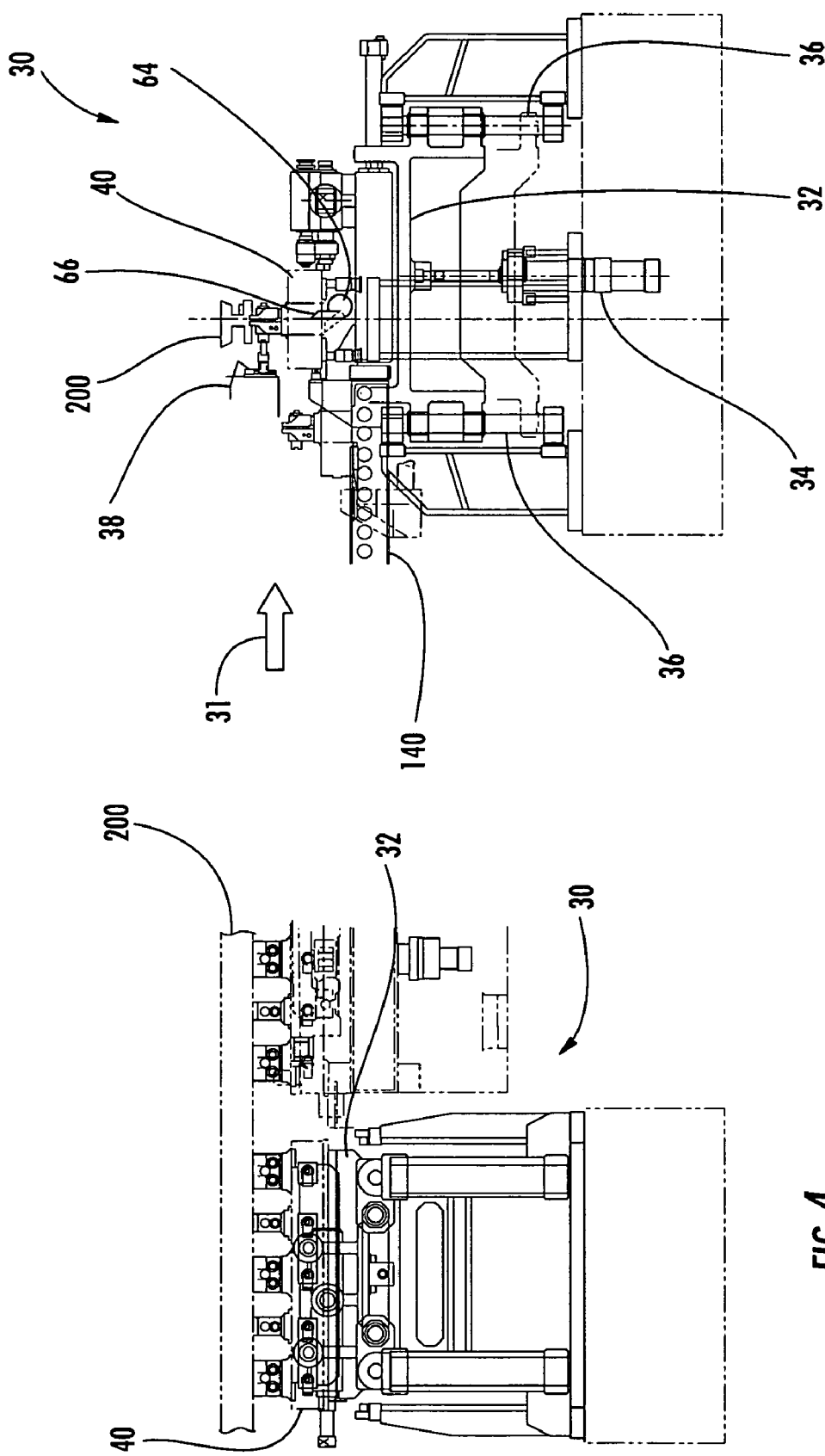

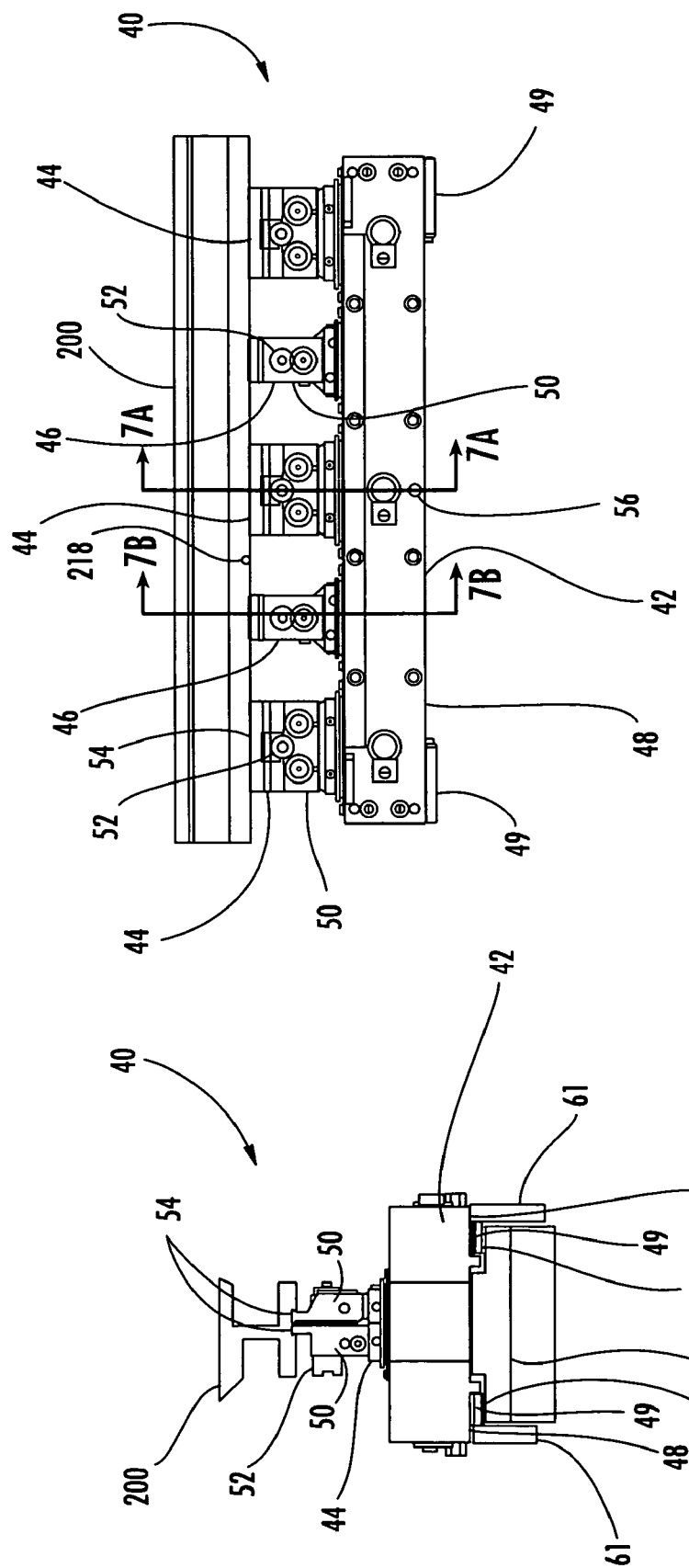

SYSTEM AND METHOD FOR MACHINING ELONGATE MEMBERS

FIELD OF THE INVENTION

This invention relates to the processing of elongate members along a generally linear flow path with multiple work cells.

BACKGROUND OF THE INVENTION

Elongate members such as spars, channel vents, and stringers for a wing or fuselage of an aircraft are typically manufactured using a large milling machine with part-specific fixed tooling. For example, in one conventional system, a long part is supported by tooling that is at least as long as the member. The tooling is especially structured to support the member in the desired configuration. A gantry is configured to move along tracks that extend parallel to the tooling, such that the gantry provides a longitudinally adjustable support for one or more machining spindles. Thus, the gantry can be adjusted along the length of the member, and the spindles can be adjusted transversely on the gantry so that the spindles can be used to machine the member to desired dimensions. Before processing in the milling machine, the member must be loaded and positioned therein, and after processing the member is removed therefrom, for example, using an overhead crane.

Such conventional milling machines are typically expensive. Moreover, while the milling machine can be used for producing members of different configurations, the tooling typically must be modified to accommodate different members. Such tooling changes can be time consuming and costly. Further, the movement and positioning of the member can be time consuming, reducing the effective operating time of the milling machine. Typically, the member is removed after machining and is then further processed, e.g., by inspecting or deburring. These subsequent processes are typically conducted in a different location, thus requiring additional tooling and further increasing the time of manufacture. In some cases, the time required to manufacture a member can be substantially longer than the time that is actually spent machining the member and performing any additional tasks of inspecting, deburring, and the like.

Thus, there exists a need for a system and method for accurately processing elongate members. The system should be capable of processing members of different configurations without time consuming and expensive retooling. Preferably, the system should also provide multiple processing operations with little delay therebetween.

SUMMARY OF THE INVENTION

The present invention provides a system and method for machining an elongate workpiece in a plurality of work cells positioned along a process flow path. The work cells are positioned sufficiently closely so that the workpiece can extend through multiple work cells and can be processed in the different work cells simultaneously.

According to one embodiment of the present invention, the system includes an infeed system that receives the workpiece and delivers the workpiece to a work zone in which the work cells are positioned along a substantially linear flow path. Each work cell has clamping members for immobilizing and stabilizing the workpiece and a tool for performing one or more work operations on the immobilized workpiece. A transport system is configured to advance the workpiece from the infeed system along the process flow path, thereby moving a plurality of lengthwise portions of the workpiece successively through the work cells. The distance between each two consecutive work cells along the path is less than the length of the workpiece, and the work cells are configured to simultaneously perform work operations on different lengthwise portions of the workpiece.

The transport system includes a plurality of pallets that are structured to be engaged to the workpiece so that the workpiece is supported by the pallets throughout at least a portion of the machining system. The transport system can also include rollers positioned along the process flow path for supporting the pallets, and an actuator can be configured to incrementally advance the pallets and the workpiece along the path. The pallets can include clamp devices for engaging a feature of the workpiece, e.g., an adjustable clamp member that is structured to be inserted into a slot defined by the workpiece and adjusted therein so that the clamp member engages the workpiece. Alignment mechanisms can be configured to move the clamp device in a desired position in the work cells. Further, each pallet can include more than one of the clamp devices, one or more of which includes a damper so that the clamp device can be movable relative to the pallet during the work operations to reduce the kinetic energy transferred from the workpiece through the pallet. That is, the damper can absorb kinetic energy that occurs in the workpiece as a result of the machining operation, thereby reducing the dynamic response of the workpiece such that the workpiece can be machined at higher rates without reduced vibration or chatter.

An inspection device can be provided along the flow path and configured to measure a dimension of the workpiece. Further, a controller can communicate with the inspection device and adjust one or more system parameters according to the dimension measured by the inspection device. A position detection device can also be positioned along the flow path and configured to determine the position of the pallets relative to the workpiece.

The present invention also provides a method for machining an elongate workpiece. A plurality of pallets are engaged to the workpiece so that the workpiece can be supported by the pallets. For example, a clamp device of each pallet can be engaged to a grip feature of the workpiece by inserting the clamp device into a slot defined by the workpiece and adjusting the clamping device to engage the workpiece. The workpiece is advanced along a substantially linear process flow path so that each of a plurality of lengthwise portions of the workpiece is successively moved to a plurality of work cells. The work cells are spaced along the flow path at distances shorter than the length of the workpiece so that as the workpiece is immobilized and stabilized in incremental positions along the flow path the workpiece in each position is disposed in at least two of the work cells. One or more work operations are performed on the different lengthwise portions of the immobilized workpiece in each of the work cells. For example, a surface of the workpiece extending in a first plane can be machined in one of the work cells and a perpendicular surface of the workpiece can be machined in a different work cell.

The passage of reference features on the workpiece along the flow path can be detected, and the workpiece can be controllably positioned along the path accordingly. Features machined in each respective lengthwise portion of the workpiece can be inspected by a respective one of the work cells before the respective lengthwise portion is advanced to the next successive work cell to determine whether the workpiece is being machined within predetermined tolerances. The operation of the work cells and the advancement of the workpiece can be controlled according to the inspecting of the features of the workpiece. At least two different lengthwise portions of the workpiece can be machined simultaneously in two different work cells. According to one aspect of the present invention, two workpieces are engaged by linking pallets that are connected to the respective workpieces. Further, the workpiece can be machined to remove the grip feature therefrom.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein:

FIG. 1 is a plan view illustrating a system according to one embodiment of the present invention;

FIG. 2 is an elevation view illustrating the cross-sectional shape of an exemplary finished workpiece that has been processed by the system of FIG. 1 according to one embodiment of the present invention;

FIG. 3 is an elevation view illustrating the cross-sectional shape of an unmachined workpiece that can be machined in the system of FIG. 1 and used to form the finished workpiece of FIG. 2;

FIG. 4 is an elevation view illustrating the pallet loader of the system of FIG. 1;

FIG. 5 is an elevation view illustrating the pallet loader of FIG. 4, as seen from the left side of FIG. 4;

FIG. 6 is an elevation view illustrating one of the pallets of the system of FIG. 1;

FIG. 7 is an elevation view illustrating the pallet of FIG. 6, as seen from the left side of FIG. 6;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 11A:
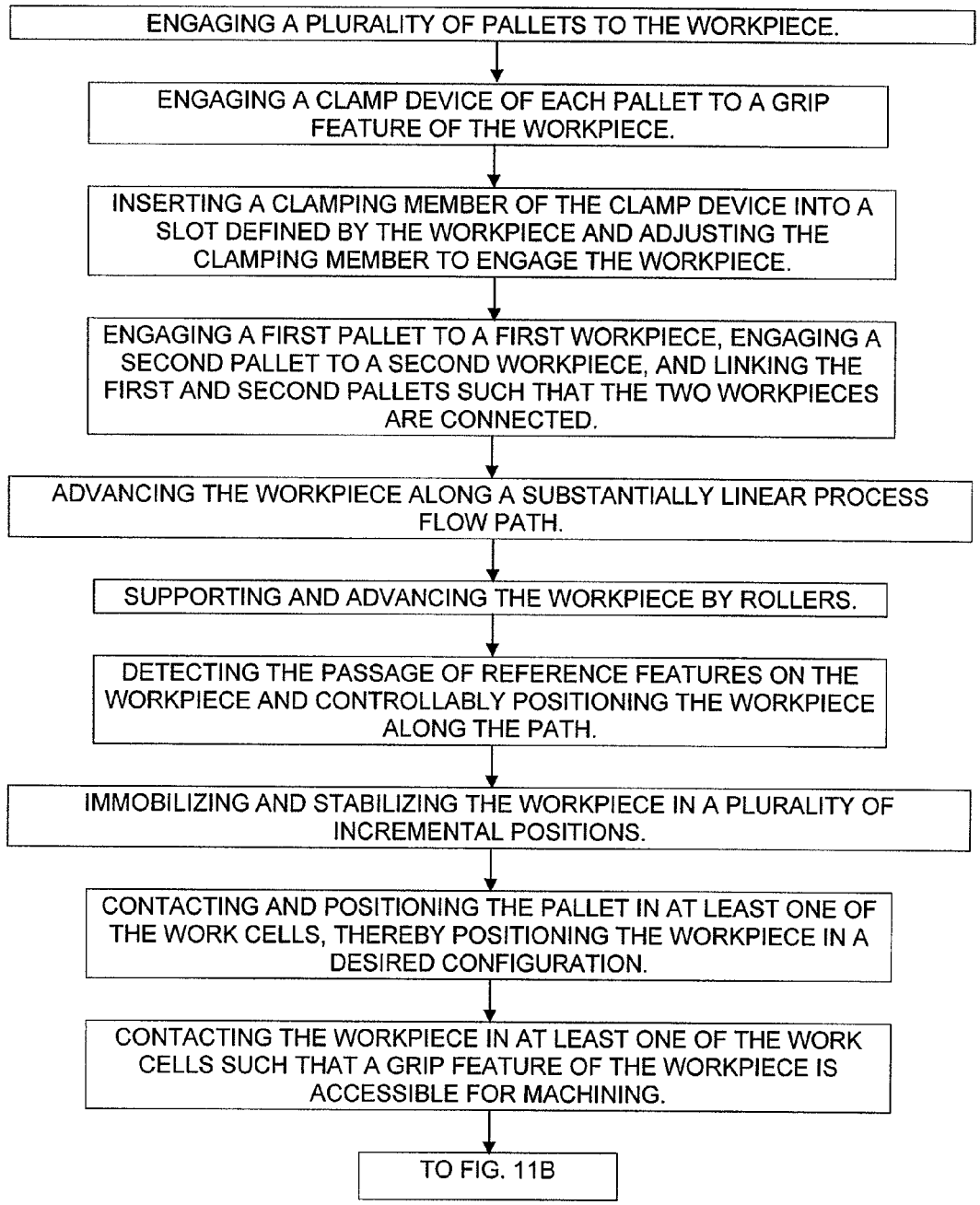
FIGS. 11A and 11B are flow diagrams illustrating the operations of a method according to one embodiment of the present invention.
Figure 11B:
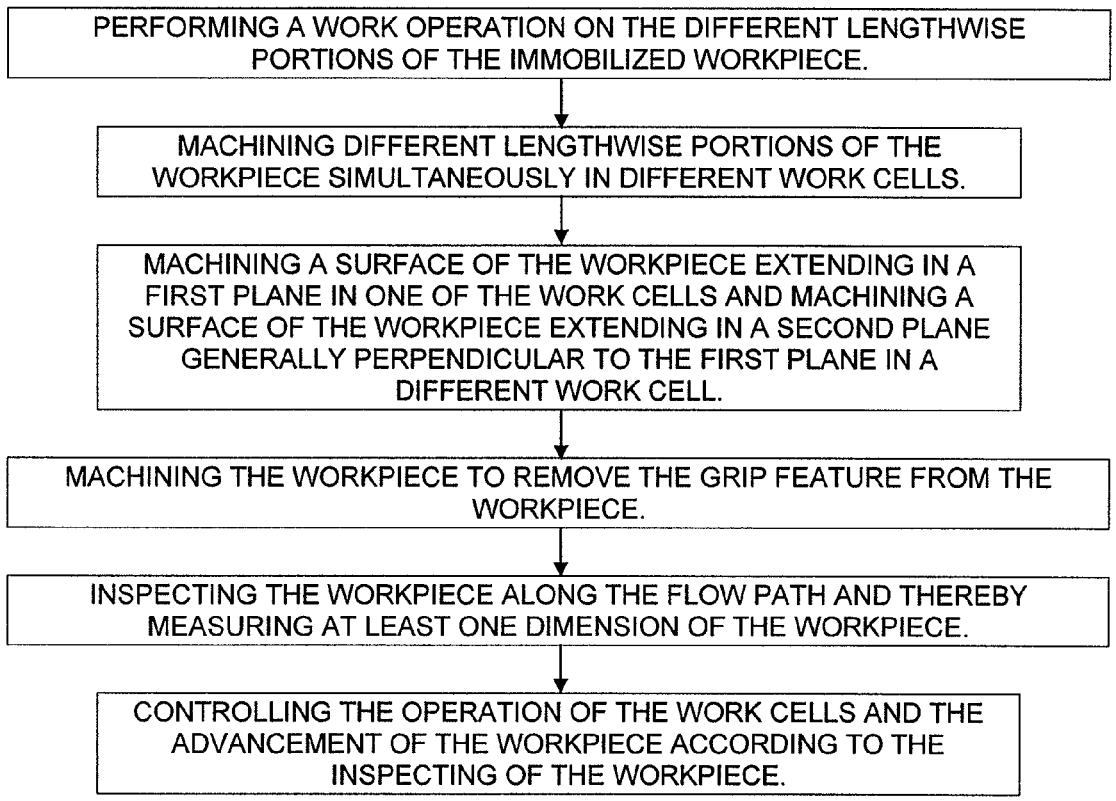

Referring now to the figures and, in particular, FIG. 1, there is shown a system 10 for performing work operations (FIGS. 11A-11B) on an elongate workpiece 200 (FIG. 2). The workpieces 200 produced with the system 10 can be used for a variety of applications. For example, the workpieces 200 can be substantially linear beams that are used in the manufacture of aircraft components such as I-, H-, or Z-shaped beams or stringers for aircraft wings. Alternatively, the workpieces 200 can be used in the construction of other vehicles, such as marine or land vehicles, or buildings and other structures. The workpieces 200 can be formed of various materials including metals such as aluminum and aluminum alloys.

The workpiece 200 can be provided to the system 10 as an unmachined member with the approximate shape of the finished workpiece 200, and the workpiece 200 can then be machined by the system 10 to the desired configuration. For example, the workpiece 200 can be extruded to have the general cross-sectional shape of the finished workpiece 200 and cut to lengths that generally correspond to the desired length of the finished workpiece 200. An extruded workpiece before machining is shown in FIG. 3. The workpiece 200 can be extruded or otherwise formed before processing in the system 10 to have dimensions that are greater than the desired dimensions of the finished workpiece 200. Thus, material can be machined or otherwise removed from the workpiece 200 by the system 10 to achieve the desired dimensions. In some cases, however, some portions of the workpiece 200 can be formed to the desired dimensions of the finished workpiece 200 before processing with the system 10. Further, some dimensions of the workpiece 200 can increase during processing throughout the system 200. For example, a long workpiece 200 can increase in length as material is removed from the workpiece 200 and internal stresses are released such that the initial workpiece may be shorter than the finished workpiece.

As illustrated in FIG. 3, the workpiece 200 is an elongate member that is formed by a conventional extrusion process. The workpiece 200 has an I-shaped cross section with four flange portions 202, 204, 206, 208 extending from a web portion 210, each flange portion 202, 204, 206, 208 being larger in at least one dimension than the desired size of the finished workpiece 200. The workpiece 200 also defines a grip feature by which the workpiece 200 can be gripped during processing. For example, the grip feature can be a dovetail slot 212, as shown in FIG. 3, that is configured to receive a clamping member. The slot 212 can be formed before processing in the system 10, e.g., during extrusion of the workpiece 200. In other embodiments of the invention, the grip feature of the workpiece 200 can alternatively be slots or channels of other configurations, apertures, flanges, posts, ridges, and the like.

As shown in FIG. 1, the system 10 includes an infeed system 20 for receiving the workpieces 200 and delivering the workpieces 200 to the rest of the system 10. Preferably, the infeed system 20 is sufficiently long to support at least one of the workpieces 200 so that the workpiece 200 can be supported by the infeed system 20 while being fed longitudinally into a work zone 60 of the system 10 for processing. The workpieces 200 can be provided to the infeed 20 system using a crane (not shown) or other appropriate machine for maneuvering the workpieces 200 to the infeed system 20, and the infeed system 20 thereafter transports the workpieces. For example, the infeed system 20 can include cylindrical rollers 22 that define a horizontal surface for supporting the workpieces 200 so that the workpieces 200 can be transported longitudinally toward an end stop 24. Wheels 26 or other rollers can also be provided for supporting the web of the workpiece 200 to stabilize the workpiece 200 in an upright configuration. The wheels 26 can be driven in directions 27 by motors or other actuators 28 to transport the workpiece 200 toward the end stop 24. Alternatively, other support and/or drive devices can be used for transporting the workpiece 200. For example, the rollers 22 can be rotated by an actuator to transport the workpiece 200 longitudinally toward the end stop 24 until a leading end 214 of the workpiece 200 is positioned against the end stop 24.

A pallet load device 30, illustrated in FIGS. 4 and 5, is located proximate to the end stop 24. The load device 30 is structured to receive pallets 40 and position the pallets 40 relative to the workpiece 200 so that the pallets 40 can be engaged thereto. The load device 30 receives the pallets 40 on a return conveyor device 140 and positions the pallets 40 beneath the workpiece 200. For example, the pallets 40 can be received in a direction 31, and the pallet load device 30 can include a lift table 32 for raising the pallets 40 individually into contact with the workpiece 200. One or more actuators 34 can be configured to raise and lower the lift table 32, which can be slidably mounted on vertical supports 36.

Each pallet 40 includes a base 42 and grippers 44, 46 extending therefrom. As illustrated in FIGS. 6 and 7, the base 42 of an exemplary embodiment of the pallet 40 defines support surfaces 48 that extend in the longitudinal direction of the pallet 40. The grippers 44, 46 extend from the base 42 opposite the support surfaces 48. The base 42 of the pallet 40 can be supported by parallel rows of rollers 61 that contact the support surfaces 48 of the base 42. Thus, the workpiece 200 can be transported longitudinally through the system 10 on the pallets 40. Further, the grippers 44, 46 maintain the workpiece 200 in a desired configuration for processing in the system 10. For example, the grippers 44, 46 can support the workpiece 200 so that the web 210 is generally perpendicular to the base 42 of the pallet 40 and perpendicular to the direction of travel of the pallets 40 and workpiece 200.

Each gripper 44, 46 on each pallet 40 can be adjustable to engage and disengage the workpiece 200. For example, each gripper 44, 46 can include opposed vise-like adjustable members 50 that are connected by a threaded adjustment screw 52. The threaded portion of the adjustment screw 52 is configured to adjustably engage at least one of the opposed members 50 so that as the screw 52 is rotated the members 50 are adjusted together or apart. A connection portion 54 of each member 50 can correspond in shape to a portion of the slot 212 of the workpiece 200. To engage the gripper 44, 46 to the workpiece, the connection portions 54 of the members 50 are inserted into the slot 212 and the screw 52 is adjusted to spread the members 50 apart, thereby anchoring the members 50 in the slot 212. By rotatably adjusting the screw 52 in the opposite direction, the members 50 can be moved together until the gripper 44, 46 can be removed from the slot 212, thereby disengaging the gripper 44, 46 from the pallet 40. The pallet load device 30 includes a gripper adjustment mechanism 38 (FIG. 5) that rotatably adjusts the screws 52 after the pallet 40 has been lifted and the grippers 44, 46 have been inserted into the slot 212 so that the pallets 40 are engaged to the workpiece 200. The gripper adjustment mechanism 38 can be configured to adjust all of the grippers 44, 46 at once, or the mechanism 38 can successively adjust each gripper 44, 46.

Figure 1A:
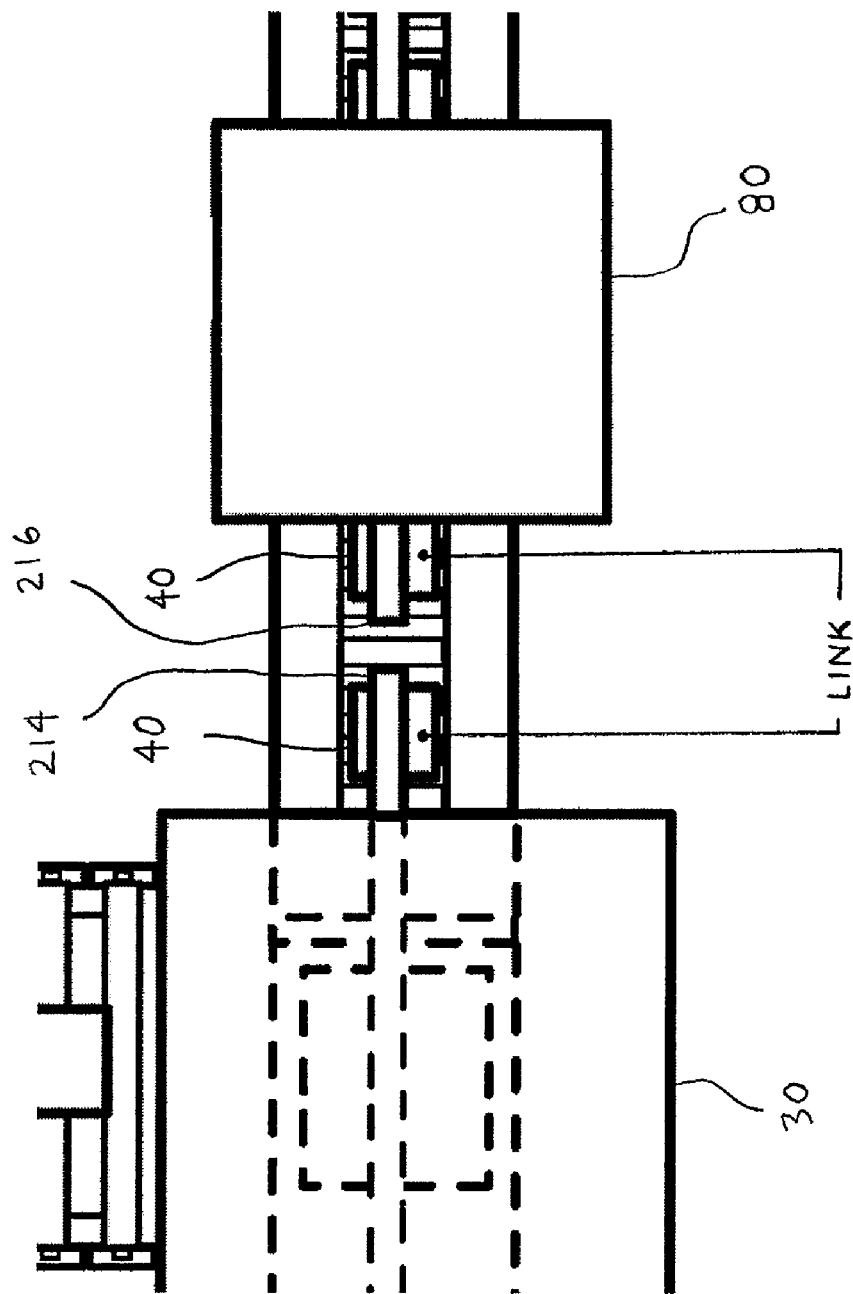
FIG. 1A is an enlarged view partially illustrating the system of FIG. 1, schematically illustrating the linking of pallets.

Any number of the pallets 40 can be engaged to the workpiece 200 by the pallet load device 30. Preferably, a sufficient number of the pallets 40 are engaged to the workpiece 200 so that the workpiece 200 can be supported without significant deformation of the workpiece 200 between the pallets 40. As illustrated in FIG. 1, the system 10 is structured to accommodate workpieces 200 that can be over 100 feet long, and the pallets 40 are engaged to the workpiece 200 so that a distance between leading edges of successive pallets 40 is about 2.9 feet, each pallet 40 being about 2.5 feet long. After each pallet 40 has been engaged to the workpiece 200, the pallet 40 and workpiece 200 can be advanced incrementally along a generally linear process flow path that extends through the work zone 60 of the system 10. In particular, the workpiece 200 can be advanced in uniform increments, e.g., about 2.9 feet, so that another pallet 40 can be engaged to the workpiece 200 in the loader device 30. The loader device 30 can continue connecting pallets 40 to the workpiece 200 until a trailing 216 end of the workpiece 200 is advanced through the loader device 30. According to one embodiment of the present invention, the last pallet 40 on a workpiece 200 can also be linked to a pallet engaging a second workpiece 200 delivered subsequently from the infeed system 20. See FIG. 1A. For example, each of the pallets 40 can include linking features that extend in the opposite longitudinal directions of the pallet 40 so that the adjacent pallets 40 on successive workpieces 200 can be linked to connect the two workpieces 200 in the system 10. In this way, any number of workpieces 200 can be connected together and fed continuously through the system 10. In another embodiment, the trailing edge of a first workpiece and the leading edge of a successively adjacent workpiece can be engaged to a pallet so that the pallet links the two workpieces.

Figure 8:
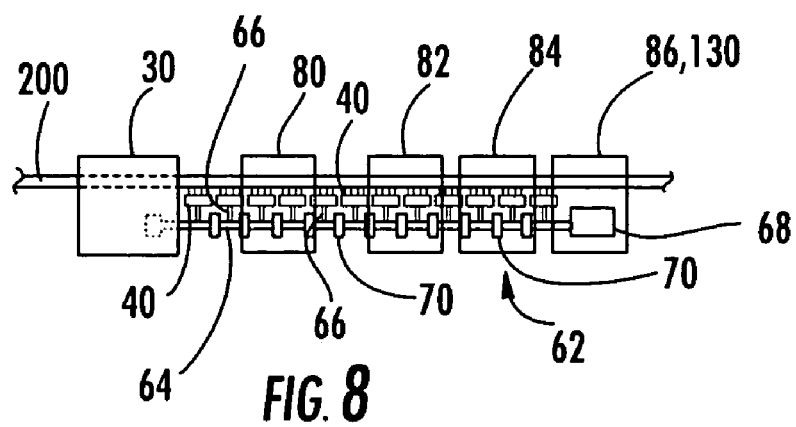
FIG. 8 is a partial elevation view of the system of FIG. 1 illustrating the transport system.

The pallets 40 and the workpiece 200 can be transported through the work zone 60 by a transport system 62 structured to engage the pallets 40 and advance the pallets 40 incrementally. As illustrated in FIG. 8, the transport system 62 includes a shaft 64 that extends longitudinally in the work zone 60. The shaft 64 is rotatable between engaged and disengaged positions. In the engaged position, the shaft 64 engages a corresponding portion of each of the pallets 40 that are connected to the workpiece 200. For example, arms 66 extending radially from the shaft 64 can be structured to selectively engage connection points on the pallets 40 when the shaft 64 is rotated to the engaged position. The shaft 64 can be supported by bearings 70 or other supports so that the shaft 64 is also adjustable through a limited range of motion in the longitudinal direction. One or more actuators 68 are configured to rotate and longitudinally adjust the shaft 64. Thus, with the shaft 64 in the engaged position, the actuator 68 can adjust the shaft 64 longitudinally, thereby also adjusting the pallets 40 and workpiece 200 longitudinally through the work zone 60.

The shaft 64 is structured to incrementally adjust the pallets 40 through the work zone 60 throughout the desired range of motion of the pallets 40 therein, e.g., between the pallet load device 30 and a pallet unload device 130. For example, the shaft 64 can be supported by the bearings 70 so that the shaft 64 can be adjusted longitudinally by the actuator 68 from a retracted position (toward the pallet load device 30) to an extended position (toward the pallet unload device 130). When the shaft 64 is rotated to the disengaged position, the shaft 64 does not engage the pallets 40 and therefore can be retracted. Thus, in operation, the shaft 64 can be adjusted to the retracted position, rotated to engage the pallets 40, and advanced longitudinally to advance the pallets 40 through the work zone 60 along an incremental distance. Subsequently, the shaft 64 can be rotated to the disengaged position and retracted, then rotated back to the engaged position so that the transport system 60 can again incrementally advance the workpiece 200 through the work zone 60. Depending on the length and configuration of the shaft 64, the shaft 64 can be retracted between each incremental motion of the pallets 40, or the shaft 64 can advance the pallets 40 through several incremental positions before being retracted. Further, each time the shaft 64 is retracted and re-engaged, the shaft 64 can engage one or more additional pallets 40, i.e., pallets 40 that have been connected to the workpiece 200 since the shaft 64 was last retracted and engaged to the pallets 40.

Figure 9:
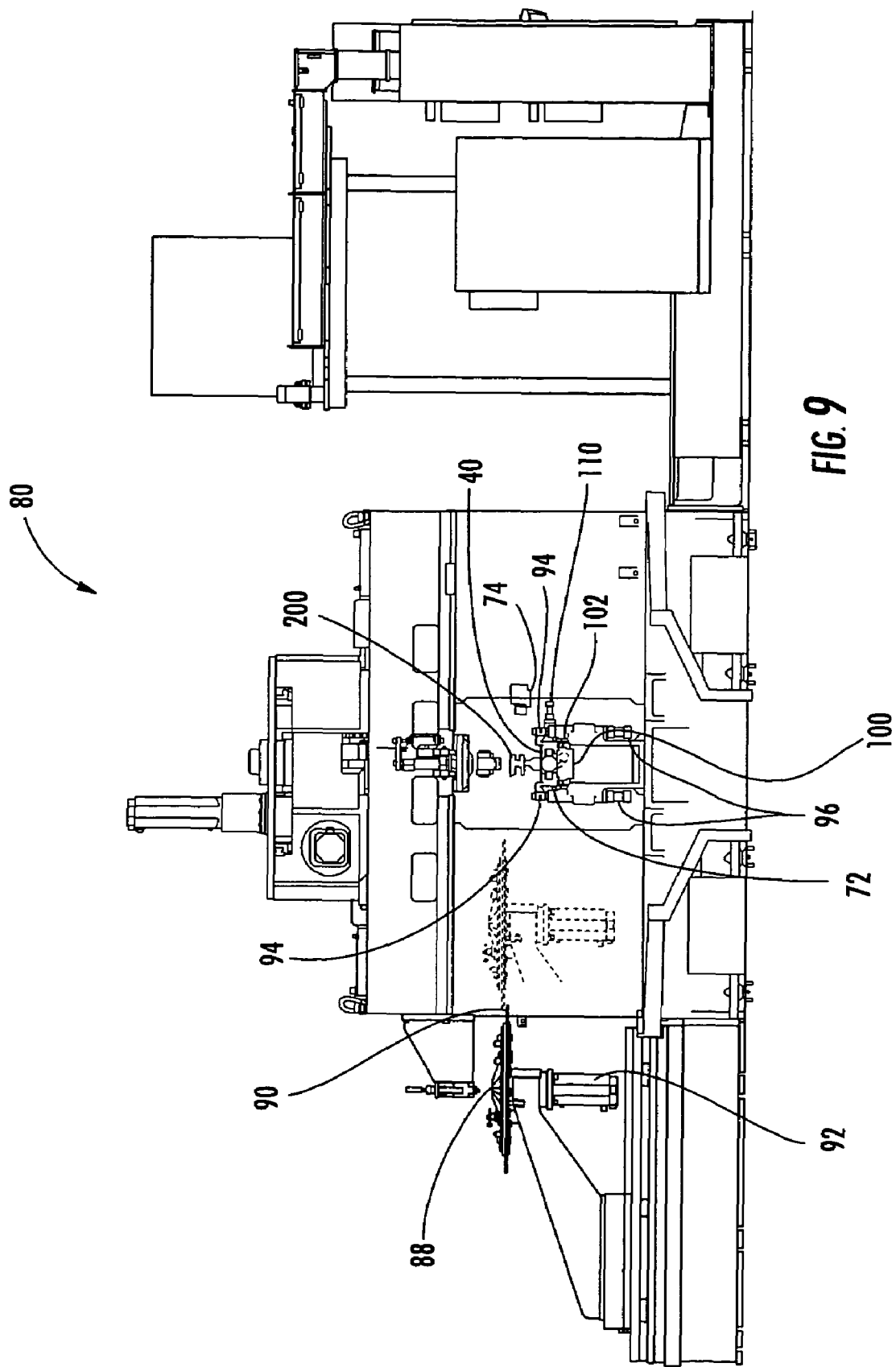
FIG. 9 is a section view in elevation illustrating the system of FIG. 1, as seen along line 9-9 through one of the work cells of the system.

Any number of work cells 80, 82, 84, 86 can be provided in the work zone 60 for processing the workpiece 200. The work cells 80, 82, 84, 86 are located at longitudinal increments along the process flow path so that the workpiece 200 is transported sequentially therethrough. Preferably, the work cells 80, 82, 84, 86 are spaced sufficiently closely along the flow path so that the workpiece 200 can extend through at least two of the work cells 80, 82, 84, 86, which can simultaneously process the workpiece 200. Each work cell 80, 82, 84, 86 is configured to perform at least one processing operation on the workpiece 200. For example, as shown in FIG. 9, each work cell 80, 82, 84, 86 can include a rotatable spindle 88 with a machining tool 90 thereon, the spindle 88 being rotated and positioned by one or more actuators 92 so that the workpiece 200 is machined with the tool 90 according to the desired dimensions of the finished workpiece 200. In other embodiments of the present invention, the work cells 80, 82, 84, 86 can include other machining or other processing devices. In any case, each lengthwise portion of the workpiece 200 can be sequentially positioned and processed in the different work cells 80, 82, 84, 86.

Each work cell 80, 82, 84, 86 can perform a processing operation to the lengthwise portion of the workpiece 200 that is positioned in the respective work cell 80, 82, 84, 86. For example, each portion of the workpiece 200 can be sequentially positioned in each of the work cells 80, 82, 84, 86, and each work cell 80, 82, 84, 86 can machine the portion of the workpiece 200 in the work cell 80, 82, 84, 86 partially or completely to the desired dimensions of the finished workpiece. In particular, the first work cell 80 can be configured to machine at least a portion of the first and second flanges 202, 204 of the workpiece 200. The second and third work cells 82, 84 can machine portions of the second and third flanges 206, 208 as well as the web 210 of the workpiece 200. The spindle 88 of each work cell 80, 82, 84, 86 is configured to be moved in the longitudinal direction of the workpiece 200 so that the entire lengthwise portion of the workpiece 200 can be processed in each work cell 80, 82, 84, 86 while the workpiece 200 is stopped in the respective work cell 80, 82, 84, 86. Preferably, each work cell 80, 82, 84, 86 machines a lengthwise portion of the workpiece 200 that is at least as long in the longitudinal, i.e., process plows direction, as the incremental movement of the workpiece 200. Thus, each work cell 80, 82, 84, 86 can successively machine the entire workpiece 200 between incremental movements of the workpiece 200. For example, the workpiece 200 can be moved longitudinally in increments of equal about 2.9 feet, i.e., the distance between corresponding points on successive pallets 40, and each of the work cells 80, 82, 84, 86 can be configured to machine over a length in the longitudinal direction of at least about 2.9 feet.

Further, each work cell 80, 82, 84, 86 can be configured to machine over a distance that is longer than the incremental movement of the workpiece 200 so that some longitudinal portions of the workpiece 200 are processed more than once by each of the work cells 80, 82, 84, 86. For example, the work cells 80, 82, 84, 86 can be configured to adjust along a longitudinal distance and machine a length of the workpiece 200 that is slightly greater than 3 feet, and each work cell 80, 82, 84, 86 can be configured to blend the ends of the machined lengthwise portion with the adjacent lengthwise portions of the workpiece 200. In some cases, the work cells 80, 82, 84, 86 are not immediately adjacent one another so that a lengthwise portion of the workpiece 200 that is machined in the first work zone 80 is not machined in the second work zone 82 until the workpiece 200 is incrementally moved more than once. For example, the workpiece 200 can be moved in longitudinal increments equal to the distance between corresponding points on successive pallets 40, and the work zones 80, 82, 84, 86 can be spaced at distances several times the distance between the corresponding points of the successive pallets 40.

The position of the workpiece 200 can generally be determined and adjusted according to the position of the pallets 40 connected thereto. For example, the shaft 64 can adjust the pallets 40, and thereby adjust the workpiece 200, along the process flow path with incremental movements of predetermined distance. In addition, the position of the workpiece 200 relative to the pallets 40 can be determined throughout the system 10. For example, location features 218 can be formed on the workpiece 200 at predetermined positions relative to a reference feature 56 on one or more of the pallets 40. Unintended movement of the workpiece 200 relative to the pallets 40 can be determined by measuring the spatial relationship between the location feature 218 on the workpiece 200 and the reference feature 56 on the pallet 40. According to one embodiment of the present invention, a drill proximate to the load device 30 is configured to drill a hole in the workpiece 200 at a position that corresponds to an aperture, pin, or other reference feature 56 on each pallet 40. The drill can be configured to drill the hole in an expendable portion of the workpiece 200 such as a portion that is to be machined from the workpiece 200 near the end of the machining process. In other embodiments of the invention, other location features can be provided on the workpiece 200 including deformations, paint marks, and the like. In any case, as the workpiece 200 is transported through the system 10, the position of the location feature 218 can be determined relative to the reference feature 56 of the respective pallet 40. For example, the reference feature 56 on each pallet 40 can be physically located by a pin 72 or other corresponding structure extending perpendicular to the process flow path at various positions along the flow path. A position detection device 74, such as an optical measurement device, which can be positioned to detect the location feature 218 and determine the position of the location feature 218 relative to the reference feature 56, can be used to determine if the position of the grippers 44, 46 relative to the workpiece 200 has changed since the pallet 40 was engaged to the workpiece 200. A significant change in the position of the pallets 40 relative to the workpiece 200 can indicate a failure event of the system 10, e.g., an unintended release of the pallets 40 from the workpiece 200. In case of such a failure event, the operation of the pallet load device 30, pallets 40, and other system components can be verified accordingly, corrected, or interrupted.

The workpiece 200 can be positioned in the work cells 80, 82, 84, 86 by locating and securing the pallets 40 in a desired configuration. According to one embodiment of the present invention, shown in FIG. 9, clamp members 94 are provided in each of the work cells 80, 82, 84, 86 for securing the pallet 40 located in the work cell 80, 82, 84, 86 during the operation of that work cell 80, 82, 84, 86. The clamp members 94 are adjusted by actuators 96 and configured to press the pallet 40 against one or more reference surfaces 98. For example, the rollers 61 in the work zone 60 can be interrupted in the first work cell 80, and a fixture, 100 can be provided therein so that the pallets 40 slide longitudinally through the work cell 80 on the fixture 100. In particular, the fixture 100 can define parallel reference fixture surfaces 102 corresponding to the position of four feet 49 on the pallet 40. As each pallet 40 is transported through the work cell 80, the support surfaces 48 of the pallet 40 roll off of the rollers 61 and the feet 49 slide on the fixture surfaces 102. When all four feet 49 of the pallet 40 are disposed on the fixture surfaces 102 and the pallet 40 has been advanced to a predetermined position in the work cell 80, the pallets 40 are stopped and the clamp members 94 secure the pallet 40 against the reference fixture surfaces 102. In this regard, the clamp members 94 can be configured to secure the pallet 40 in a predetermined position in the work cell 80. In particular, the clamping members 94 can be configured to press the pallet 40 against the reference fixture surfaces 102, thereby securing the pallet 40 in a predetermined location in the work cell 80. Advantageously, the workpiece 200 can be positioned by contacting the pallets 40 with the clamp members 94 and generally without requiring that the clamp members locate and directly contact the workpiece 200. In some embodiments, however, additional positioning devices can be provided in the work cells 80, 82, 84, 86 for directly contacting the workpiece 200. For example, the workpiece 200 can be contacted directly by positioning devices that urge the workpiece 200 to a generally linear configuration in the work cells 80, 82, 84, 86.

Figure 7A:
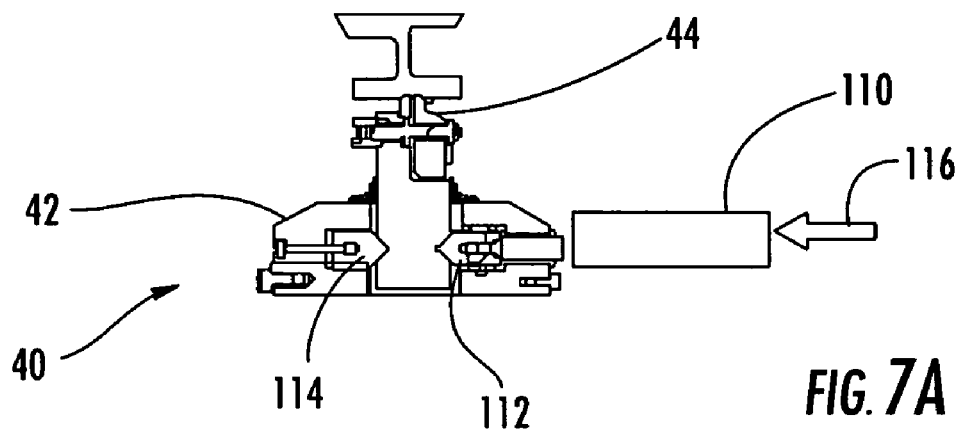
FIG. 7A is a section view illustrating the pallet of FIG. 7, as seen along line 7A-7A of FIG. 7.
Figure 7B:
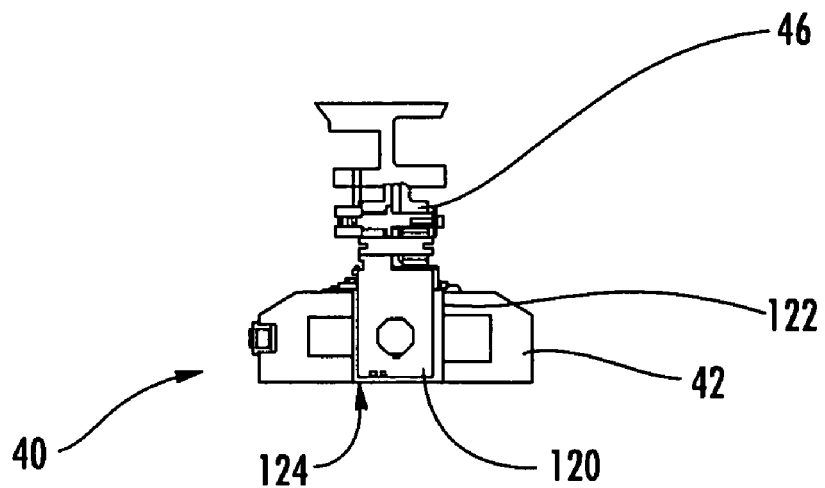
FIG. 7B is a section view illustrating the pallet of FIG. 7, as seen along line 7B-7B of FIG. 7.

In some embodiments of the present invention, some or all of the grippers 44, 46 can be configured to "float," or move through a limited range of motion relative to the pallets 40. For example, as shown in FIGS. 7A and 7B, the grippers 44, 46 of each of the pallets 40 are movable relative to the base 42 of the respective pallet 40, e.g., to accommodate slight nonuniformities and/or changes in the configuration of the workpiece 200. Thus, even if the slot 212 on the workpiece 200 is not precisely uniform and linear along the longitudinal direction of the workpiece 200, e.g., because the workpiece 200 is slightly curved or otherwise deformed, the grippers 44, 46 can still be connected to the workpiece 200. An alignment mechanism 110 can be provided in the work cells 80, 82, 84, 86 to move the first grippers 44 and, hence, the workpiece 200 to a preferred position. For example, the first grippers 44 (FIG. 7A) can be engaged by pins 112, 114 disposed in the pallets 40 so that when the alignment mechanism 110 urges the first pins 112 in direction 116, the grippers 44 are secured between the opposing pins 112, 114 in the desired position. The alignment mechanism 110 can be configured to engage the pins 112 on one side of the pallet 40 and urge the pins 112 in the direction 116 transverse to the longitudinal motion of the pallets 40, and motion of the second pins 114 in direction 116 can be impeded by the base 42 of the pallet 40. Thus, the alignment mechanism 110 can adjust the first grippers 44 slightly to a desired position and secure the first grippers 44 in that position, thereby positioning the workpiece 200 in a desired position for machining in the work cell 80, 82, 84, 86. Some of the grippers 44, 46 can be configured to resist movement relative to the base 42 in one or more directions.

For example, one of the first grippers 44 can be configured to resist adjustment relative to the base 42 in the longitudinal direction of the pallet 40 so that registration can be maintained between the base 42 and the workpiece 200. Thus, the location of the workpieces 200 in the longitudinal direction can be controlled precisely according to the placement of the pallets 40 throughout the system 10, i.e., in each of the work cells 80, 82, 84, 86.

Alternatively, some of the grippers 44, 46 can float relative to the base 42 of the pallet 40, even when the pallets 40 are secured in the work cells 80, 82, 84, 86. For example, the second grippers 46 (FIG. 7B) can float similarly to the first grippers 44, and the second grippers 46 can remain in the floating configuration when the first grippers 44 are secured with the alignment mechanism 110. Advantageously, the second grippers 46 can be configured as dampers to isolate shocks or otherwise reduce the kinetic energy transferred through the pallets 40 during the work operations. In particular, the second grippers 46 can be squeeze film dampers, i.e., devices containing a fluid between opposed surfaces so that a relative movement of the opposed surfaces is opposed by the fluid therebetween and such movement results in heating of the fluid. For example, each second gripper 46 can include a shaft 120 rigidly connected to the adjustable opposed members 50 and a cylindrical sleeve 122 rigidly connected to the base 42 of the pallet 40. The shaft 120 is disposed in the sleeve 122 with a space 124 between the outer surface of the shaft 120 and the inner surface of the sleeve 122. A fluid, such as oil, is contained in the space 124 so that relative motion between the sleeve 120 and shaft 122, and hence between the gripper 46 and base 42, is resisted and dampened by the fluid. The damping characteristics of the grippers 46 can be determined according to such parameters as the size and configuration of the shaft 122 and sleeve 120, the type of fluid, and the like. It is appreciated that the damping characteristics can be optimized for a particular application. For example, the grippers 46 can be configured to dampen vibrations that result from a particular machining operation that is conducted in one or more of the work cells 80, 82, 84, 86.

Each of the work cells 80, 82, 84, 86 can include the clamping and machining devices described above, and the clamping and machining devices of each of the work cells 80, 82, 84, 86 can function at the same time so that the workpiece 200 is processed simultaneously at multiple locations, thereby reducing the time required for processing the workpiece 200. When the machining function in each of the work cells 80, 82, 84, 86 has been completed, the clamp members 94 are disengaged from the pallets 40 in the work cells 80, 82, 84, 86, and the workpiece 200 is incrementally transported longitudinally along the process flow path by the shaft 64 and the pallets 40. As the pallets 40 move longitudinally, the feet 49 slide along the fixture surfaces 102 until the support surfaces 48 slide back onto the rollers 61.

As noted above, the work cells 80, 82, 84, 86 can be configured to machine successively longitudinal portions of the workpiece 200 to desired dimensions. Each longitudinal portion of the workpiece 200 can be machined by one or more of the work cells 80, 82, 84, 86, and the machining operations generally can be performed throughout the work cells 80, 82, 84, 86 according to the configuration of each of the work cells 80, 82, 84, 86, the desired order of machining operations, the time required for each of the machining operations, and the like. Advantageously, each of the work cells 80, 82, 84, 86 can perform a portion of the machining to the cross-sectional shape of the workpiece 200 so that the time required for machining in each of the work cells 80, 82, 84, 86 is about the same, thereby reducing any time during which one or more of the work cells 80, 82, 84, 86 is inactive. Further it is appreciated that any number of work cells 80, 82, 84, 86 can be provided throughout the system 10 according to the total machining required and the desired machining time for each workpiece 200.

Figure 10:
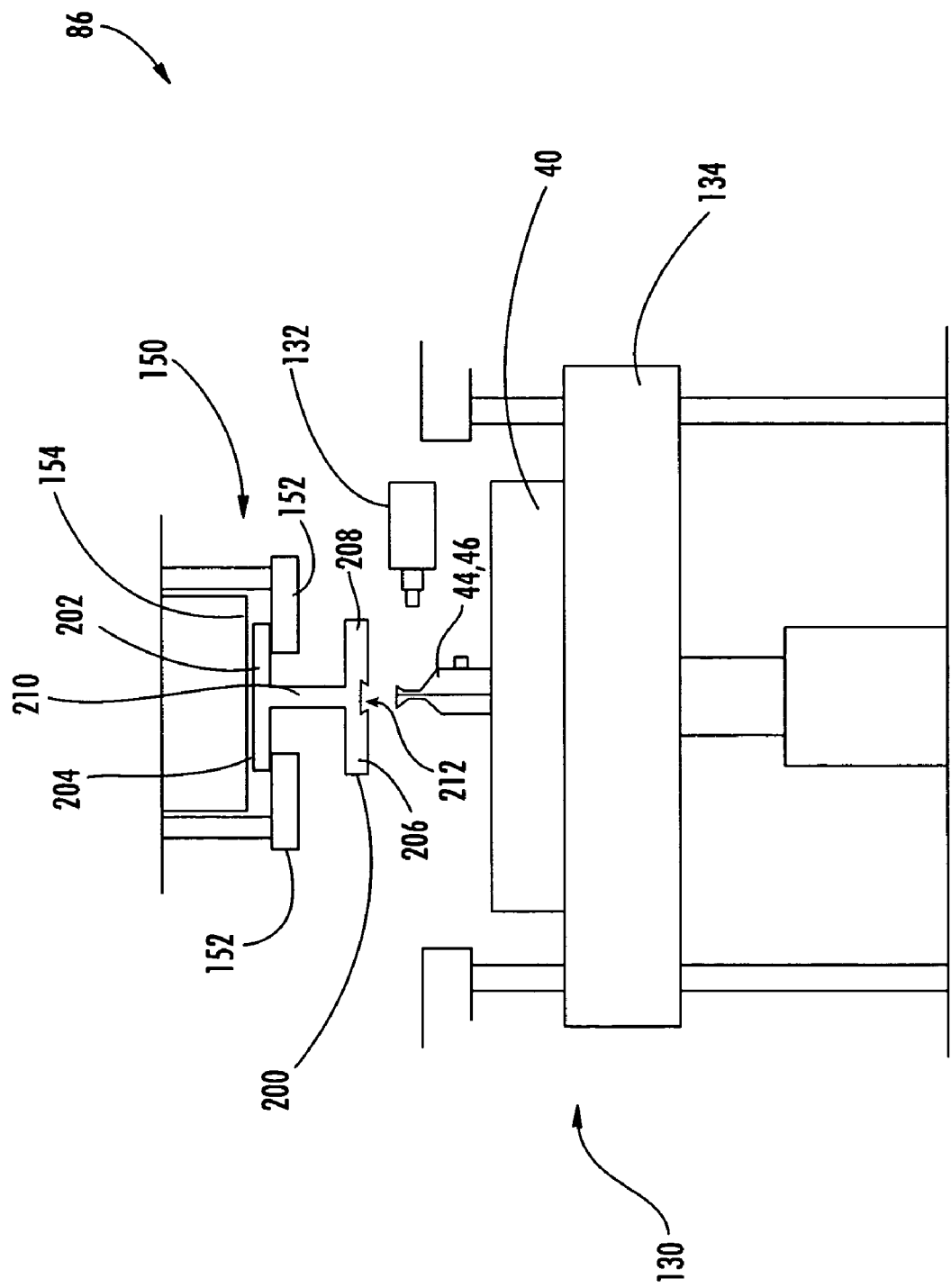
FIG. 10 is a section view in elevation illustrating the fourth work cell and the pallet unload device of the system of FIG. 1, as seen along line 10-10 of FIG. 1.

After the workpiece 200 has been transported through the work zone 60, the pallets 40 are unloaded from the workpiece 200 by the pallet unload device 130, shown in FIG. 10. The pallet unload device 130 includes a lowering table 134, similar to the lift table 32, and which is located longitudinally beyond the range of motion of the shaft 64. The pallet unload device 130 also includes a gripper adjustment mechanism 132 configured to rotatably adjust the screws 52 so that the opposed members 50 of the grippers 44, 46 are adjusted together and the pallets 40 are thereby disengaged from the workpiece 200. With one of the pallets 40 supported on the lowering table 134, the grippers 44, 46 are adjusted together, and the pallet 40 is then lowered on the table 134 so that the grippers 44, 46 are retracted from the slot 212 of the workpiece 200. Subsequently, the pallets 40 are transported back to the pallet load device 30 on the return conveyor device 140, which can use rotating rollers 142 or other actuation devices to return the pallets 40 to the load device 30.

The final work cell 86 can be located at the pallet unload device 130 or even further longitudinally downstream therefrom. In this regard, each longitudinal portion of the workpiece 200 can be machined after the pallet 40 that is proximate to the respective lengthwise portion of the workpiece 200 is removed. The work cell 86 can be used to machine portions of the cross section of the workpiece 200 that cannot be machined, or cannot easily be machined, when the pallet 40 is connected. For example, the work cell 86 can machine the workpiece 200 to remove the portion of the flange 208 defining the slot 212 by which the pallets 40 are connected to the workpiece 200.

According to one embodiment of the present invention, shown in FIG. 10, the workpiece 200 is secured in the fourth work cell 86 by a clamping mechanism 150 before being machined therein. The clamping mechanism 150 can be configured to contact the workpiece 200 directly. For example, the clamping mechanism 150 can include actuating clamps 152 that extend from transverse sides of the workpiece 200 inward between the first and fourth flanges 202, 208 and between the second and third flanges 204, 206 toward the web 210. The clamps 152 are adjusted toward the first and second flanges 202, 204 so that the first and second flanges 202, 204 are secured against a reference surface 154, thereby securing the workpiece 200 in a predetermined position. With the workpiece 200 so secured, the work cell 86 can machine the workpiece 200, e.g., to remove material from any portions of the third and fourth flanges 206, 208.

After the workpiece 200 has been machined in the fourth work cell 86, the dimensions of the workpiece 200 have preferably been modified to the desired dimensions, thereby forming the finished workpiece 200. The finished workpiece 200 can be transported linearly from the unload device 130 by an outfeed system 160, which can be similar to the infeed system 20 described above. For example, the outfeed system 160 can include rollers 162 that define a surface for supporting the finished workpiece 200 so that the workpiece 200 can be transported longitudinally away from the unload device 130 and the work cells 80, 82, 84, 86. Wheels 164 or other rollers can also be provided for supporting the web 210 of the workpiece 200 to stabilize the workpiece 200 in an upright configuration, and the wheels 164 can be driven by motors 166 or other actuators to transport the workpiece 200. The workpiece 200 can be transported linearly by the outfeed system 160 until the entire workpiece 200 is transported beyond the unload device 130 and the fourth work cell 86. Thereafter, the workpiece 200 can be unloaded from the outfeed system 160, e.g., by an overhead crane that is connected to the workpiece 200 and used to lift and move the workpiece 200.

The motion of the workpiece 200 is generally stepwise throughout the system 10. That is, the workpiece 200 can be moved incrementally through a predetermined distance in each motion. Between the incremental motions, the workpiece 200 can be machined in the work cells 80, 82, 84, 86 or otherwise processed in the system 10. Thus, the workpiece 200 can define any number of lengthwise portions that are machined to various degrees. Further, the workpiece 200 can be machined in the work cells 80, 82, 84, 86 before the workpiece 200 is entirely fed through the pallet load device 30, i.e., while part of the workpiece 200 is still supported by the infeed system 20. Similarly, the workpiece 200 can be machined while some portions of the workpiece 200 have been fully machined and have already passed through the pallet unload device 130 and are supported by the outfeed system 160. The motion of the workpiece 200 while supported by the infeed system 20 and the finished workpieces 200 on the outfeed system 160 can be incremental in nature according to the motion within the work zone 60. Further, the infeed and outfeed systems 20, 160 can be driven incrementally in correspondence with the incremental motion of the shaft 64. For example, a controller 182 can communicate with each of the infeed, outfeed, and transport systems 20, 160, 62 and thereby control the motion of the workpiece 200 through the system 10. The controller 182 can also control the timing and operation of the work cells 80, 82, 84, 86 and other system devices. In other embodiments of the present invention, the infeed and outfeed systems 20, 160 can alternatively be undriven, i.e., the workpieces 200 can be pulled into and pushed out of the work zone 60 by the portions of the workpiece 200 that are disposed in the work zone 60 and engaged by the pallets 40 and the shaft 64.

Various additional processes can be performed while the workpieces 200 are passing through the system 10. For example, the system 10 can include an edge preparation system 170 including one or more rotating grinding tools that are adjusted to contact the edges or surfaces of the workpiece 200, thereby removing burrs or other undesirable irregularities. Additionally, the system 10 can include other processing devices such as chemical or heat treatment devices. Further, inspection devices 180 can be provided on the outfeed system 160 to inspect one or more dimensions of the workpiece 200 and determine if the workpiece 200 has been processed correctly. Inspection devices 180 can also be positioned at the infeed system 20 or in the work zone 60, e.g., in or proximate to the work cells 80, 82, 84, 86. In any case, the inspection devices 180 can be optical devices that determine the size and configuration of one or more portions of the workpiece 200 and compare that data to predetermined dimensions, e.g., the desired dimensions of the finished workpiece 200. If the dimensions of the workpiece 200 are outside an expected or accepted range, the system 10 can automatically adjust one or more operating parameters and/or signal an operator. For example, the inspection device can communicate with the controller 182, and the controller 182 can control such parameters as the operation of the shaft 64 and the operation of the work cells 80, 82, 84, 86 in response to the feedback provided by the inspection devices 180.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for machining an elongate workpiece, the method comprising:
   engaging a plurality of pallets to the workpiece such that the workpiece is configured to be supported by the pallets;
   advancing the pallets and the workpiece along a substantially linear process flow path so as to successively move each of a plurality of lengthwise portions of the workpiece to a plurality of work cells spaced along the flow path at distances shorter than a length of the workpiece;
   immobilizing and stabilizing the workpiece in a plurality of incremental positions along the flow path, the workpiece in each position being disposed in at least two of the work cells; and
   performing at least one work operation on different lengthwise portions of the immobilized workpiece in each of the work cells.

2. A method according to claim 1, further comprising detecting the passage of reference features on the workpiece along the flow path and controllably positioning the workpiece along the path according to the passage of the reference features.

3. A method according to claim 1, further comprising machining at least two different lengthwise portions of the workpiece simultaneously in two different work cells.

4. A method according to claim 1 wherein said advancing step comprises supporting the pallets and the workpiece by a plurality of rollers positioned along the process flow path and advancing the workpiece along the rollers.

5. A method according to claim 1 wherein said engaging step comprises engaging at least one clamp device of each pallet to a grip feature of the workpiece.

6. A method according to claim 5 wherein said engaging step comprises inserting a clamping member of the clamp device into a slot defined by the workpiece and adjusting the clamping member to engage the workpiece.

7. A method according to claim 5, further comprising machining the workpiece to remove the grip feature from the workpiece.

8. A method according to claim 1 wherein said engaging step comprises engaging a first pallet to a first of the workpieces, engaging a second pallet to a second of the workpieces, and linking the first and second pallets such that the two workpieces are connected.

9. A method according to claim 1, further comprising machining a surface of the workpiece extending in a first plane in one of the work cells and machining a surface of the workpiece extending in a second plane generally perpendicular to the first plane in a different work cell.

10. A method according to claim 1, further comprising inspecting the workpiece along the flow path and thereby measuring at least one dimension of the workpiece.

11. A method according to claim 10, further comprising controlling the operation of the work cells and the advancement of the workpiece according to the inspecting of the workpiece.

12. A method according to claim 1 wherein said immobilizing and stabilizing step comprises contacting and positioning the pallet in at least one of the work cells, thereby positioning the workpiece in a desired configuration.

13. A method according to claim 12 wherein said immobilizing and stabilizing step comprises contacting the workpiece in at least one of the work cells such that a grip feature of the workpiece is accessible for machining.

14. A method according to claim 1 wherein said engaging step comprises engaging a plurality of clamp devices of each pallet to the workpiece.

15. A method according to claim 1 wherein said engaging step comprises independently engaging each pallet to the workpiece.

16. A method according to claim 1 wherein said engaging step comprises positioning each of the pallets individually into contact with the workpiece and engaging each pallet to the workpiece.

17. A method according to claim 1 wherein said engaging step comprises engaging at least three pallets to the workpiece.

18. A method for machining an elongate workpiece, the method comprising:
   engaging a plurality of pallets to the workpiece such that the workpiece is configured to be supported by the pallets;
   supporting the pallets and the workpiece by a plurality of rollers positioned along a substantially linear process flow path and advancing the workpiece along the rollers along the process flow path so as to successively move each of a plurality of lengthwise portions of the workpiece to a plurality of work cells spaced along the flow path at distances shorter than a length of the workpiece;
   immobilizing and stabilizing the workpiece in a plurality of incremental positions along the flow path, the workpiece in each position being disposed in at least two of the work cells; and
   performing at least one work operation on different lengthwise portions of the immobilized workpiece in each of the work cells.

19. A method according to claim 18, further comprising detecting the passage of reference features on the workpiece along the flow path and controllably positioning the workpiece along the path according to the passage of the reference features.

20. A method according to claim 18, further comprising machining at least two different lengthwise portions of the workpiece simultaneously in two different work cells.

21. A method according to claim 18 wherein said engaging step comprises engaging at least one clamp device of each pallet to a grip feature of the workpiece.

22. A method according to claim 21 wherein said engaging step comprises inserting a clamping member of the clamp device into a slot defined by the workpiece and adjusting the clamping member to engage the workpiece.

23. A method according to claim 21, further comprising machining the workpiece to remove the grip feature from the workpiece.

24. A method according to claim 18 wherein said engaging step comprises engaging a first pallet to a first of the workpieces, engaging a second pallet to a second of the workpieces, and linking the first and second pallets such that the two workpieces are connected.

25. A method according to claim 21, further comprising machining a surface of the workpiece extending in a first plane in one of the work cells and machining a surface of the workpiece extending in a second plane generally perpendicular to the first plane in a different work cell.

26. A method according to claim 18, further comprising inspecting the workpiece along the flow path and thereby measuring at least one dimension of the workpiece.

27. A method according to claim 26, further comprising controlling the operation of the work cells and the advancement of the workpiece according to the inspecting of the workpiece.

28. A method according to claim 18 wherein said immobilizing and stabilizing step comprises contacting and positioning the pallet in at least one of the work cells, thereby positioning the workpiece in a desired configuration.

29. A method according to claim 28 wherein said immobilizing and stabilizing step comprises contacting the workpiece in at least one of the work cells such that a grip feature of the workpiece is accessible for machining.

30. A method according to claim 18 wherein said engaging step comprises engaging a plurality of clamp devices of each pallet to the workpiece.

31. A method according to claim 18 wherein said engaging step comprises independently engaging each pallet to the workpiece.

32. A method according to claim 18 wherein said engaging step comprises positioning each of the pallets individually into contact with the workpiece and engaging each pallet to the workpiece.

33. A method according to claim 18 wherein said engaging step comprises engaging at least three pallets to the workpiece.

34. A method for machining an elongate workpiece, the method comprising:
    engaging at least one clamp device of each of a plurality of pallets to a grip feature of the workpiece such that the workpiece is configured to be supported by the pallets,
    advancing the workpiece along a substantially linear process flow path so as to successively move each of a plurality of lengthwise portions of the workpiece to a plurality of work cells spaced along the flow path at distances shorter than a length of the workpiece;
    immobilizing and stabilizing the workpiece in a plurality of incremental positions along the flow path, the workpiece in each position being disposed in at least two of the work cells;
    performing at least one work operation on different lengthwise portions of the immobilized workpiece in each of the work cells; and
    machining the workpiece to remove the grip feature from the workpiece.

35. A method for machining an elongate workpiece, the method comprising:
    engaging a plurality of pallets to the workpiece such that the workpiece is configured to be supported by the pallets;
    advancing the workpiece along a substantially linear process flow path so as to successively move each of a plurality of lengthwise portions of the workpiece to a plurality of work cells spaced along the flow path at distances shorter than a length of the workpiece;
    immobilizing and stabilizing the workpiece in a plurality of incremental positions along the flow path, the workpiece in each position being disposed in at least two of the work cells;
    performing at least one work operation on different lengthwise portions of the immobilized workpiece in each of the work cells; and
    machining a surface of the workpiece extending in a first plane in one of the work cells and machining a surface of the workpiece extending in a second plane generally perpendicular to the first plane in a different work cell.

36. A method for machining an elongate workpiece, the method comprising:
    engaging a plurality of pallets to the workpiece such that the workpiece is configured to be supported by the pallets;
    advancing the workpiece along a substantially linear process flow path so as to successively move each of a plurality of lengthwise portions of the workpiece to a plurality of work cells spaced along the flow path at distances shorter than a length of the workpiece;
    immobilizing and stabilizing the workpiece in a plurality of incremental positions along the flow path, the workpiece in each position being disposed in at least two of the work cells; and
    performing at least one work operation on different lengthwise portions of the immobilized workpiece in each of the work cells,
    wherein said immobilizing and stabilizing step comprises contacting and positioning the pallet in at least one of the work cells, thereby positioning the workpiece in a desired configuration, and contacting the workpiece in at least one of the work cells such that a grip feature of the workpiece is accessible for machining.

* * * * *